F. KOHOUT & R. C. LANGLEY.
HEADLIGHT.
APPLICATION FILED FEB. 28, 1910.

976,468.

Patented Nov. 22, 1910.

WITNESSES:
J. L. Bowling
L. E. Noack.

INVENTORS
F. Kohout
R. C. Langley.
BY
ATTORNEYS.

UNITED STATES PATENT OFFICE.

FREDERICK KOHOUT AND ROBERT C. LANGLEY, OF DALLAS, TEXAS; SAID KOHOUT ASSIGNOR TO GEORGE LANGLEY, OF DALLAS, TEXAS.

HEADLIGHT.

976,468. Specification of Letters Patent. Patented Nov. 22, 1910.

Application filed February 28, 1910. Serial No. 546,437.

*To all whom it may concern:*

Be it known that we, FREDERICK KOHOUT and ROBERT C. LANGLEY, citizens of the United States, residing at Dallas, in the county of Dallas and State of Texas, have invented certain new and useful Improvements in Headlights, of which the following is a specification.

Our invention relates to new and useful improvements in safety head-lights and more particularly to that class of safety headlights used on automobiles.

The object of our invention is to provide a device of the character described which will be pivotally connected to the body of an automobile and arranged to be turned in the direction in which the front wheels are traveling.

Another object of our invention is to provide a device of the character described which will not be affected by the shocks to which the running gear of an automobile is often subjected.

A further object of our invention is to provide a device of the character described which will be operated by a link directly connected to the steering mechanism and not by levers supported on the running gear.

Finally the object of the invention is to provide means of the character described that will be strong, durable, efficient, and easy of operation, simple and comparatively inexpensive to construct, and also in which the several parts will not be likely to get out of working order.

Figure 1:
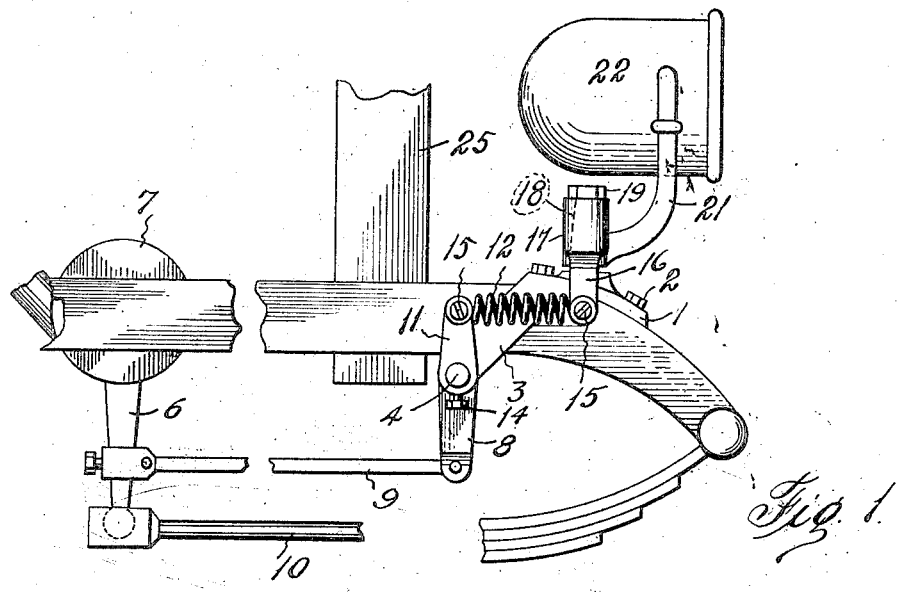
Figure 2:
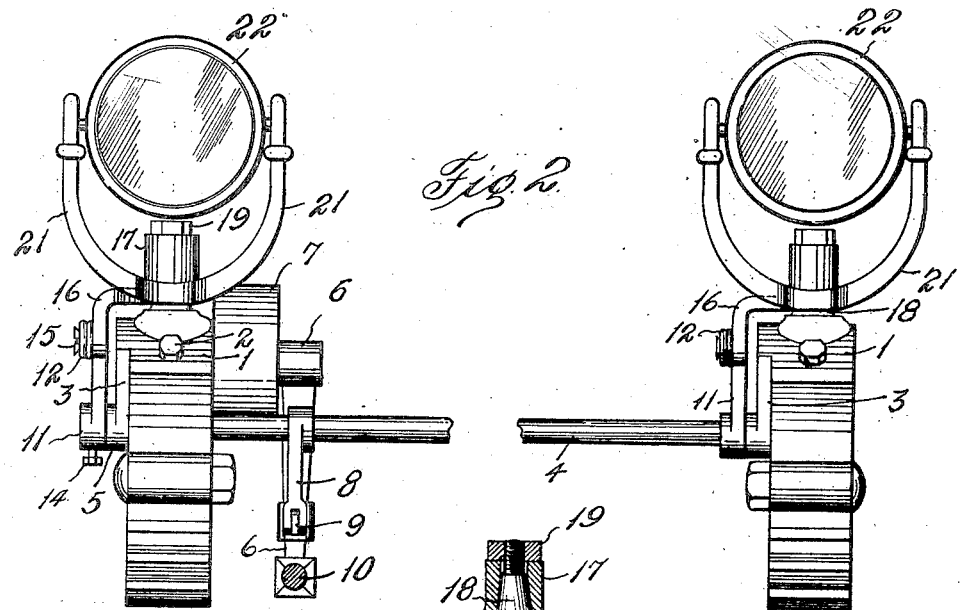
Figure 3:
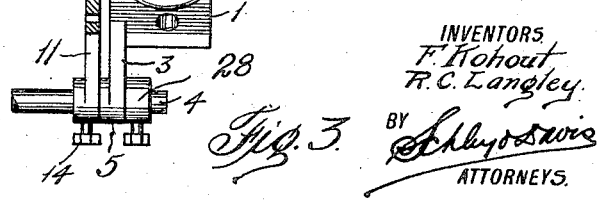

With the above and other objects in view, the invention has relation to certain novel features of construction and operation, an example of which is described in this specification and illustrated in the accompanying drawings, wherein:

Figure 1. is a side elevation of our invention attached to a portion of an automobile, Fig. 2. is a front elevation of the same, and Fig. 3. is a detail view of the lamp support with the lamp bracket broken away to show the spindle on which it turns.

In the drawings, the numeral 1, designates a base plate adapted to be fixed on the chassis of an automobile by bolts 2, and to support a rearwardly extending arm 3. A transverse shaft 4 is supported in bearings 5 formed on the extremity of the arms 3 and is held against lateral movement by arms 11 and a collar 28. An arm 8 mounted on the shaft 4 has connection with a rocker arm 6 fixed on the steering gear 7 through a link 9. The steering gear 7, the arm 6 and the link 10 are a part of the usual steering mechanism and the operation of these forms no part of our invention.

Adjacent the ends of the shaft 4, arms 11 are held in position to engage with one end of a spring 12 by set screws 14. The springs 12 are wound with open coils and have several coils turned out to form a bearing at either end through which screws 15 may be inserted. The other end of spring 12 is held in engagement with an arm 16 carried on a sleeve 17. This sleeve is supported and arranged to revolve on a vertical truncated spindle 18 made integral with the base plate 1 and is held thereon by a nut 19 engaging with threads arranged on the upper portion of the spindle.

Brackets 21 are arranged to support a suitable lamp 22 above the sleeve 17 and a little in front of the radiator 25 of the car.

As the arm 6 is moved from the steering wheel (not shown) to guide the machine the link 9 is likewise moved and the same motion is communicated to the shaft 4 and arms 11, and thence through the springs to the arms 16 and the lamps are turned in the same direction as the wheels, thus the light is always kept directly in the path of the car and many serious accidents may be avoided.

It is obvious that the operating mechanism of this head-light being supported and operated from parts carried by the chassis will not be subjected to the shocks and vibration of the running gear. It will also be noted that the shaft 4 which extends transversely across the car is positioned close enough to the radiator to prevent it from being in the way when it is necessary to crank or start the engine. The spring 12 will absorb any vibration or quick motion that might be given to the steering mechanism. The truncated spindle not only compensates for the wear of the sleeve 17, but acts at all times as an anti-rattler.

What we claim is:

1. In a device of the character described, the combination with bases arranged on a vehicle frame, of lamp brackets arranged to revolve on the bases, lamps carried by the brackets, a shaft supported by the bases, rocker arms arranged on the shaft, resilient links connecting the rocker arms with the lamp brackets, and means for rocking the shaft.

2. In a device of the character described, the combination with bases arranged to be secured on a vehicle frame, of truncated spindles carried by the bases, lamp brackets arranged to revolve on the spindles, lamps carried by the brackets, a shaft supported by the bases, rocker arms arranged on the shaft, resilient links connecting the rocker arms with the lamp brackets, and means for rocking the shaft.

3. In a head-light, the combination with bases arranged to be secured on a vehicle frame, of truncated spindles carried by the bases, lamp brackets arranged to revolve on the spindles, lamps carried by the brackets, a shaft supported by the bases, rocker arms arranged on the shaft, resilient links connecting the rocker arms with the lamp brackets, means for rocking the shaft, and a link engaging with one of the rocker arms connected with the steering mechanism arranged to transmit a rocking motion to the shaft.

4. In a head-light of the character described, the combination with bases adapted to be secured to the frame of a vehicle, of truncated spindles carried by the bases, lamp brackets arranged to revolve on the spindle, lamps carried by the brackets, a shaft supported from the bases, arms fixed on the lamp brackets, rocker arms supported on the shaft, resilient links connecting the rocker arms with those arms carried by the brackets, and means for rocking the shaft.

5. In a device of the character described, the combination with a plurality of bases adapted to be fastened to the frame of an automobile, of rearwardly extending arms made integral with the bases, a shaft supported by the arms, rocker arms mounted on the shaft, truncated spindles carried by the base, sleeves carrying lamp brackets arranged to revolve on the spindles, lamps supported by the brackets, resilient links connecting the rocker arms with arms fixed on the sleeve, and means for rocking the shaft.

In testimony whereof we have signed our names to this specification in the presence of two subscribing witnesses.

FREDERICK KOHOUT.
ROBERT C. LANGLEY.

Witnesses:
JACK A. SCHLEY,
L. E. NOACK.